United States Patent
Anderson et al.

(10) Patent No.: US 11,128,568 B2
(45) Date of Patent: *Sep. 21, 2021

(54) ROUTING PACKETS IN MULTIPLE DESTINATION NETWORKS WITH OVERLAPPING ADDRESS SPACES

(71) Applicant: International Business Machines Corporation, Armonk, NY (US)

(72) Inventors: Eric M. Anderson, Friendswood, TX (US); Susan A. Hearn, Ontario (CA); Linwood E. Loving, Mechanicsville, VA (US); Martin G. Mclaughlin, Glasgow (GB); Daniel R. Miller, Prospect, CT (US); John B. Simmons, Westminster, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/508,132

(22) Filed: Jul. 10, 2019

(65) Prior Publication Data
US 2019/0334819 A1     Oct. 31, 2019

Related U.S. Application Data

(63) Continuation of application No. 15/495,232, filed on Apr. 24, 2017, now Pat. No. 10,425,330.

(51) Int. Cl.
*H04L 12/741* (2013.01)
*H04L 12/46* (2006.01)

(52) U.S. Cl.
CPC .......... *H04L 45/74* (2013.01); *H04L 12/4633* (2013.01)

(58) Field of Classification Search
None
See application file for complete search history.

(56) References Cited

U.S. PATENT DOCUMENTS

| 6,229,808 | B1 * | 5/2001 | Teich | H04L 49/309 370/398 |
| 6,396,811 | B1 * | 5/2002 | Petersen | H04L 49/309 370/250 |
| 6,411,629 | B1 * | 6/2002 | Bentall | H04L 1/0083 370/392 |

(Continued)

OTHER PUBLICATIONS

List of all IBM related dockets. Appendix P, 2019.

*Primary Examiner* — Andrew C Oh
(74) *Attorney, Agent, or Firm* — Garg Law Firm, PLLC; Rakesh Garg; William Hartwell (57) ABSTRACT

A packet is analyzed at an outbound end of a tunnel from a first data network to determine whether the packet is directed to a first remote target in a first remote data network over a first tunnel or to a second remote target in a second remote data network over a second tunnel. A target address of the packet is present in both the first remote data network and the second remote data network. When the packet is to be directed to the first remote target in the first remote data network, an octet in the target address of the packet is changed from a first value to a second value, the changing forming a modified packet. When the second value is stored in the octet, the modified packet is caused to be sent to the tunnel for delivery to the second data network.

20 Claims, 7 Drawing Sheets

(56) References Cited

U.S. PATENT DOCUMENTS

| Patent/Pub. No. | | Date | Inventor | Classification |
|---|---|---|---|---|
| 6,425,010 B1 | * | 7/2002 | Alles | G06Q 30/02 709/225 |
| 6,532,435 B1 | * | 3/2003 | Aoshika | G06Q 20/10 370/254 |
| 6,711,141 B1 | * | 3/2004 | Rinne | H04L 47/10 370/328 |
| 7,379,979 B2 | * | 5/2008 | Huo | H04L 29/1232 370/254 |
| 10,123,063 B1 | * | 11/2018 | Brown | H04N 21/42684 |
| 2001/0043603 A1 | * | 11/2001 | Yu | H04Q 11/0478 370/393 |
| 2002/0038419 A1 | * | 3/2002 | Garrett | H04L 12/2872 713/154 |
| 2002/0131446 A1 | * | 9/2002 | Metcalf, III | H04L 29/06 370/465 |
| 2002/0141382 A1 | * | 10/2002 | Winther | H04W 28/06 370/352 |
| 2002/0191541 A1 | * | 12/2002 | Buchanan | H04L 12/4641 370/230 |
| 2003/0177218 A1 | * | 9/2003 | Poirot | H04L 43/0817 709/223 |
| 2003/0227907 A1 | * | 12/2003 | Choi | H04L 29/06027 370/352 |
| 2004/0042402 A1 | * | 3/2004 | Galand | H04L 45/28 370/237 |
| 2004/0100924 A1 | * | 5/2004 | Yam | H04L 69/161 370/328 |
| 2004/0218603 A1 | * | 11/2004 | Lee | H04L 12/1836 370/390 |
| 2004/0236991 A1 | * | 11/2004 | Brundridge | H04L 1/24 714/25 |
| 2005/0147120 A1 | * | 7/2005 | Willman | H04L 61/2521 370/466 |
| 2005/0267978 A1 | * | 12/2005 | Satapati | H04L 69/167 709/230 |
| 2006/0015608 A1 | * | 1/2006 | Becker | H04L 41/069 709/224 |
| 2006/0243217 A1 | * | 11/2006 | Patterson | A01K 15/027 119/700 |
| 2007/0030848 A1 | * | 2/2007 | Miyata | H04L 12/4633 370/389 |
| 2007/0168579 A1 | * | 7/2007 | Croughwell, III | G06F 13/28 710/22 |
| 2007/0177499 A1 | * | 8/2007 | Gavrilescu | H04L 43/0811 370/229 |
| 2007/0177524 A1 | * | 8/2007 | Qian | H04J 3/16 370/252 |
| 2008/0075069 A1 | * | 3/2008 | Fourcand | H04Q 11/0478 370/357 |
| 2008/0075124 A1 | * | 3/2008 | Fourcand | H04J 3/1611 370/503 |
| 2008/0201751 A1 | * | 8/2008 | Ahmed | H04N 21/4312 725/109 |
| 2008/0229430 A1 | * | 9/2008 | Kargman | G06Q 30/0603 726/28 |
| 2009/0016368 A1 | * | 1/2009 | Lowekamp | H04L 45/00 370/401 |
| 2009/0213850 A1 | * | 8/2009 | Viger | H04L 47/40 370/389 |
| 2010/0020779 A1 | * | 1/2010 | Kalhan | H04W 8/082 370/338 |
| 2010/0061272 A1 | * | 3/2010 | Veillette | H04L 45/48 370/254 |
| 2010/0138551 A1 | * | 6/2010 | Degaonkar | H04L 61/2503 709/228 |
| 2010/0150020 A1 | * | 6/2010 | Rosen | H04L 45/28 370/254 |
| 2010/0284305 A1 | * | 11/2010 | Papp | H04L 12/4641 370/254 |
| 2010/0287171 A1 | * | 11/2010 | Schneider | G06F 16/9014 707/759 |
| 2011/0026537 A1 | * | 2/2011 | Kolhi | H04L 12/4633 370/401 |
| 2011/0032843 A1 | * | 2/2011 | Papp | H04L 45/50 370/254 |
| 2011/0132721 A1 | * | 6/2011 | Kevin | B65G 47/848 198/349 |
| 2011/0277034 A1 | * | 11/2011 | Hanson | H04L 63/1433 726/25 |
| 2012/0134358 A1 | * | 5/2012 | Bellagamba | H04L 12/4641 370/392 |
| 2013/0151032 A1 | * | 6/2013 | Kraeling | H04L 67/12 701/1 |
| 2013/0155845 A1 | * | 6/2013 | Patel | H04L 45/04 370/225 |
| 2013/0182708 A1 | * | 7/2013 | Sharma | H04L 12/4625 370/392 |
| 2013/0311661 A1 | * | 11/2013 | McPhee | H04L 61/1511 709/226 |
| 2014/0052831 A1 | * | 2/2014 | Wijnands | H04L 12/1854 709/220 |
| 2014/0078929 A1 | * | 3/2014 | Stan | H04L 61/2007 370/254 |
| 2014/0078949 A1 | * | 3/2014 | Chu | H04W 52/0219 370/311 |
| 2015/0074277 A1 | * | 3/2015 | Shigeeda | H04L 12/40006 709/226 |
| 2017/0070417 A1 | * | 3/2017 | Jain | H04L 45/20 |
| 2017/0086253 A1 | * | 3/2017 | Kyou | H04L 61/2038 |
| 2017/0281110 A1 | * | 10/2017 | Mandelkern | A61B 6/5217 |
| 2017/0289216 A1 | * | 10/2017 | N | H04L 45/22 |
| 2017/0353477 A1 | * | 12/2017 | Faigon | G06F 21/6209 |
| 2018/0124008 A1 | * | 5/2018 | Tackabury | H04L 63/0407 |
| 2018/0276764 A1 | * | 9/2018 | Acosta | G06Q 40/123 |

\* cited by examiner

ROUTING PACKETS IN MULTIPLE DESTINATION NETWORKS WITH OVERLAPPING ADDRESS SPACES

TECHNICAL FIELD

The present invention relates generally to a method, system, and computer program product for correctly routing data packets to the correct destination network. More particularly, the present invention relates to a method, system, and computer program product for routing packets in multiple destination networks with overlapping address spaces.

BACKGROUND

Transmission Control Protocol (TCP) is a commonly used communication protocol used for communicating packet data from one data processing system to another over a data network. Internet Protocol (IP) is an addressing protocol to handle the addressing of the TCP data packets. Together, the layers of the two protocols are implemented as a TCP/IP stack for constructing, sending, and receiving the packets from one data processing system to another data processing system across data networks.

IP version 4 (IPv4) is the fourth version of IP which sets out internet addresses in the form of four octets. An octet is eight bits (each bit capable of representing a binary 0 value or a binary 1 value). The 32-bit IPv4 address takes the form of "A.B.C.D", where A, B, C, and D are each an octet. Each octet is capable of representing 256 Base 10 values, 0-255. The Base 10 value 0 is a reserved value of an octet and usually indicates a group of other Base 10 numbers of a subnet that are permissible in that octet. A subnet is a part of a network in which at least one octet of the addressing is common with other parts of the network, and a differing octet takes on different values within the part.

Hereinafter, a reference to a first octet is a reference to the "A" octet in the above IPv4 representation. Similarly, a reference to a second octet is a reference to the "B" octet, a reference to a third octet is a reference to the "C" octet, and a reference to a fourth octet is a reference to the "D" octet in the above IPv4 representation. For example, in an example IP address 192.168.1.2, the first octet has the value 192 in Base 10, the second octet has the value 168 in Base 10, the third octet has the value 1 in Base 10, and the forth octet has the value 2 in Base 10. Hereinafter, unless an octet is represented in binary, or unless expressly distinguished where used, a value of an octet refers to a Base 10 value represented in the octet.

Some IPv4 address spaces are reserved for internal use within a local area network (LAN). For example, 192.0.0.0 and 10.0.0.0 are two address spaces which are supposed to be configured for uniqueness within only a LAN, and are not supposed to be unique across Wide Area Networks (WAN). Internet Engineering Task Force (IETF) document 'Request for Comments-1918' (RFC-1918) identifies that the following IPV4 address ranges have been reserved by Internet Assigned Numbers Authority (IANA) for private Internets: 10.0.0.0/8, 172.16.0.0/12, and 192.168.0.0/16. Therefore, as an example, two different LANs can each implement 10.x.y.z address, e.g., 10.2.3.4, such that 10.2.3.4 will be uniquely associated with a network interface of a target system or application, the uniqueness being valid only with each respective LAN.

SUMMARY

The illustrative embodiments provide a method, system, and computer program product. An embodiment includes a method that analyzes, at an outbound end of a tunnel from a first data network, a packet to determine whether the packet is directed to a first remote target in a first remote data network over a first tunnel or to a second remote target in a second remote data network over a second tunnel, wherein a target address of the packet is present in both the first remote data network and the second remote data network. The embodiment changes, responsive to the packet being directed to the first remote target in the first remote data network, an octet in the target address of the packet from a first value to a second value, the changing forming a modified packet. The embodiment causes, responsive to storing the second value of the octet, the modified packet to be sent to the tunnel for delivery to the second data network.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

An application or system that sends a packet is hereinafter referred to as a "source" system, or simply a "source". A LAN within which the source system operates is hereinafter referred to as a "local" network. An application or system that receives a packet is hereinafter referred to as a "target" system, or simply a "target". A LAN within which the target system operates is hereinafter referred to as a "remote" network.

A reference to a "network" is a reference to a physical LAN or a virtual LAN unless specifically distinguished where used. A "gateway" is a suitable type of system that routes packets originating from a source within a network, arriving for a target inside the network, or both. Generally, a gateway can be implemented using one or more routers, one or more firewalls, or a combination of similarly functioning networking components. In the illustrative embodiments, the gateway is a physical or virtual device that is operating as a virtual private network (VPN) endpoint, which sends outbound packets from a source to a VPN for delivery to a target on the remote end of the VPN.

A source within one network (local-1 network) often has to send a data packet to a target in another network. Sometimes the other network (local-2 network) is also on the same side of the gateway as the local-1 network in which the source is operating. At other times, the other network (remote-1 network) may be on the opposite side of the gateway from the local-1 network of the source.

More than one remote networks may be reachable via their respective VPNs coupled to the gateway. For example, remote-1 network may have a VPN tunnel "VPN1" with the gateway, another remote network—remote-2 network—may have a VPN tunnel "VPN2" with the gateway, and so on up to remote network—remote-n network—may have a VPN tunnel "VPNn" with the gateway, wherein n is any number greater than 1.

The illustrative embodiments recognize that in some cases, multiple networks where a source can send a packet may have implemented IPv4 addressing that overlaps for at least some addresses. For example, the local-2 network may have implemented a 10.55.104.10 address and the remote-1 network may also have implemented a 10.55.104.10 address. As another example, the remote-1 network may have implemented a 10.55.104.10 address and the remote-n network may also have implemented a 10.55.104.10 address. Generally, any combination to two or more destination networks of a packet can have similarly overlapping address-spaces with any number of addresses common to the overlapped address-space.

When a source in local-1 network sends a packet to 10.55.104.10 address, a confusion arises as to whether the packet should go to the 10.55.104.10 target in remote-1 network or the 10.55.104.10 target in local-2 network, or the 10.55.104.10 target in remote-n network. A gateway receiving the packet from local-1 network may misroute the packet to local-2 target when the packet was supposed to go to remote-1 target and vice-versa, misroute the packet to remote-1 target when the packet was supposed to go to remote-n target and vice-versa, or drop the packet. Such situations are problematic and a solution is needed to allow the gateway to correctly route the packet to the packet's intended destination.

The illustrative embodiments recognize that the presently available tools or solutions do not address these needs/problems or provide adequate solutions for these needs/problems. The illustrative embodiments used to describe the invention generally address and solve the above-described problems and other related problems by routing packets in multiple destination networks with overlapping address spaces.

An embodiment can be implemented as a software application. The application implementing an embodiment, or one or more components thereof, can be configured as a modification of an existing gateway—i.e., a native application in the gateway, as an application executing in a data processing system—such as a central cloud controller device—communicating with an existing gateway over a local area network (LAN)—i.e., a local application on the LAN, as an application executing in a data processing system communicating with an existing gateway over a wide area network (WAN)—i.e., a remote application on the WAN, as a separate application that operates in conjunction with an existing gateway in other ways, a standalone application, or some combination thereof.

An embodiment operates to process an outbound packet. The embodiment operates in conjunction with a gateway. The gateway is configured to route a packet from a source in a local network (local-1) to a target in any of the several remote networks (remote-1 . . . remote-n) on the other end of several corresponding VPNs coupling to the gateway. The gateway can also route a packet from the source in local-1 to a target in another local network (local-2) which is on the same side of the gateway.

The embodiment causes a source, such as an application executing on a data processing system on local-1 network, to determine that an outbound packet is targeted at a remote target across a VPN. The embodiment causes the source to determine a code corresponding to the intended target. A target code is a code that is configured in any suitable manner such that the code uniquely identifies a particular target in a set of targets.

In one example embodiment, a repository containing target codes is accessible from the source. A target record may be stored in the repository as an address record. An address record is an entry that relates an IP address of a target with a code of the target. For example, target 1 in remote-1 network may be encoded as T1 or 0001 or ABC, target 2 in remote-2 network may be encoded as T2 or 0002 or XYZ, target n in remote-n network may be encoded as Tn or 9999 or PQR, or binary bit representations thereof. As can be seen, a particular target in a remote network can be encoded in any suitable manner. The embodiment selects the appropriate code for the intended target.

In one example embodiment, the selected code is stored in an unused space in a predetermined header of the packet. The header can be any header, including but not limited to an option header. The unused space in the predetermined header may be a field that is unused, sparingly used, optionally used, or usable in a custom manner within the given implementation. Furthermore, the unused space may be of any suitable size sufficient to accommodate the size of the code.

An embodiment causes the selected target code to be stored or placed in the selected unused space in the predetermined header of the packet. A modified or encoded packet is thus formed. The embodiment causes the encoded packet to be sent from the source to the gateway.

Modifying the header in the packet is not always necessary. An embodiment determines whether the packet to be sent out from the source is targeted to a local target, e.g., a target in local-2 network. In the case of such packets, the embodiment allows the source to omit the modification of the header when the packet is to be targeted at a local target, or generally when the packet is not to be targeted at a remote target.

An embodiment detects an outbound packet arriving at a gateway from a source in local-1 network. For example, the packet arriving at the gateway may be an encoded packet whose header has been modified to contain a target code in a manner described herein, or a packet that a source sends without such modifications for the reasons described herein.

When the packet is an encoded packet, the embodiment determines whether the target address in the packet is in a remote network. When the target address in the packet is an address in the remote network, the embodiment enters a process to swap an octet—i.e. change an existing value of the octet—in the target address with a new value of the octet.

Specifically, the determination whether a target address is in a remote network is governed by the target code stored in the modified header of the encoded packet. When a target code is present in the predetermined field in the predetermined header, the embodiment concludes that the packet is to be sent to a remote target and not a local target even if the target address exists in a local network.

Owing to the overlapping address spaces in the remote networks, there may be several remote targets that might have the target address of the packet. To disambiguate which of the several remote targets is the correct recipient of the encoded packet, an embodiment executes a swapping rule.

The swap of an octet—i.e., changing the octet value from one value to another—in a target address is governed by a set of swapping rules. A swapping rule provides the gateway a replacement or swap value if the gateway finds a particular target code in an encoded packet.

In one embodiment, a single rule can be configured to determine whether a target code has been encoded in the packet, and the replacement octet value to use for the target code, if one has been encoded in the packet.

For example, the target address may be 10.2.15.34 in the packet arriving from the source. The packet might also include target code "Tn". Accordingly, a swapping rule might provide that when code "Tn" is found in a predetermined header in a predetermined location/field/space of the header, the first octet should be replaced with a value 2. Using the swapping rule, the gateway changes the target address from 10.2.15.34 to 2.2.15.34.

The modified target address formed as a result of the swapping now allows the packet to be routed to a path that leads from the gateway to a VPN associated with 2.x.x.x addresses. This routing of the packet with the modified target address is performed using the presently available routing methods, e.g., using a routing table.

If the packet does not include a target code, or includes a default target code, then the embodiment causes no swapping of the octet. Accordingly, the gateway causes the packet to be routed to the same side of the gateway as the source, e.g., by sending the packet to a backend router that facilitates communication between various local networks such as between local-1 network of the source and local-2 network of the target.

When the packet reaches the backend router, the backend router delivers the packet to the target in the local-2 network. Thus, the packet is correctly routed to a target in a local network on the same side of the gateway or on a correct remote network the opposite side of the gateway from the source even though the local network, one or more remote networks, or a combination thereof, might have implemented overlapping address spaces.

Another embodiment operates to process an inbound packet. The embodiment operates in conjunction with a gateway that can route a received packet to a target in the remote network. For example, such an embodiment operates to allow a gateway operating in conjunction with the remote network to receive the packet that was transmitted over the VPN with the modified target address described earlier.

The embodiment determines that a received packet has a swapped octet. The embodiment makes this determination using a swap-back rule. A swap-back rule is configured to change a value of an octet in the target address of a received packet from the value contained in the octet in the received packet to an octet value that was originally configured by the source of the received packet.

For example, suppose that the modified target address in the received packet is 2.2.15.34 for the reasons described above. A swap-back rule determines that if the first octet has a value "2", the value of that octet should be changed to "10". Accordingly, the swap-back rule causes the receiving gateway to change the target address from 2.2.15.34 back to 10.2.15.34. the receiving gateway can now route the modified received packet to the intended target in the remote network. The routing to the target inside the remote network can be accomplished using existing routing methods, such as a routing table.

In another embodiment, the octet swapping functions and the octet swap-back functions are implemented together. Such a combined implementation allows for the correct routing of packets in both directions of the data traffic when overlapping address spaces exist on both sides of a VPN.

The manner of routing packets in multiple destination networks with overlapping address spaces described herein is unavailable in the presently available methods. A method of an embodiment described herein, when implemented to execute on a device or data processing system, comprises substantial advancement of the functionality of that device or data processing system in correctly routing packets when the packet address has an octet that is used by at least one network on the local side of the gateway and at least one network on the remote side of the gateway.

The illustrative embodiments are described with respect to certain types of addresses, target codes, headers, fields or spaces, octet values, records, rules, gateways, networks, sources, targets, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
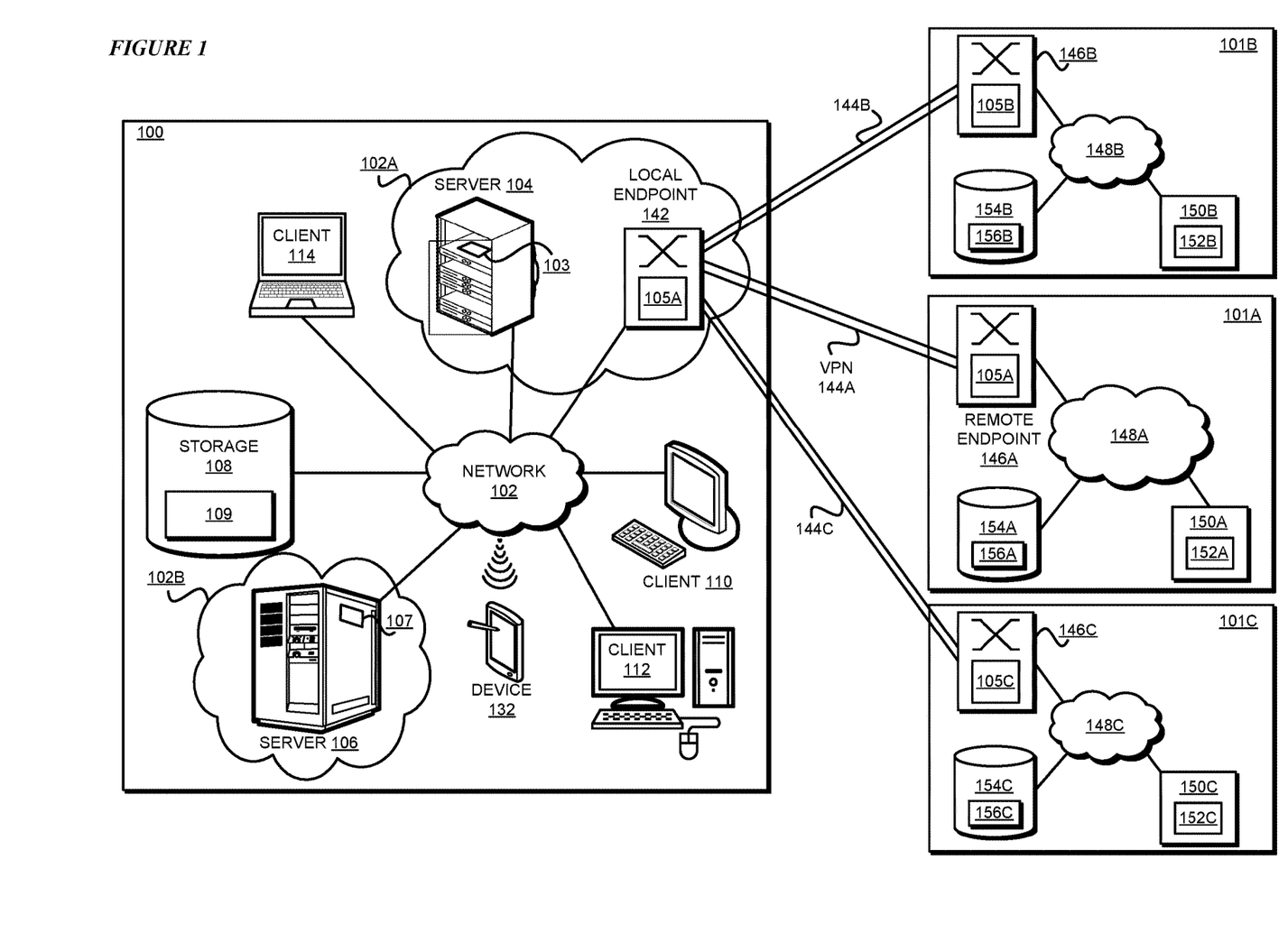
FIG. 1 depicts a block diagram of a network of data processing systems in which illustrative embodiments may be implemented.
Figure 2:
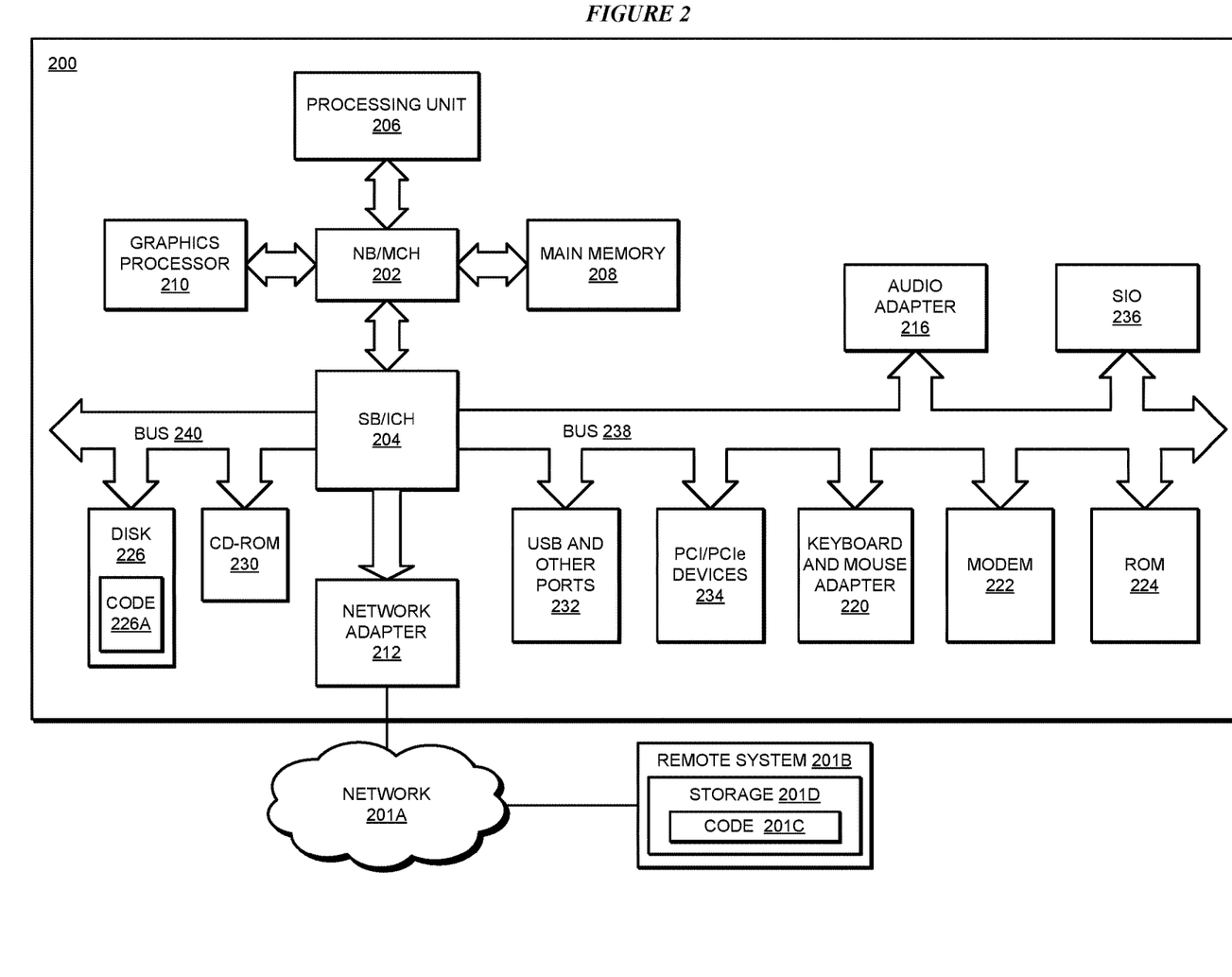
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an outbound-side embodiment described herein. Applications 105A, 105B, and 105C each implement an inbound-side embodiment described herein. Applications 105 and 105A-C can each be configured to implement both the outbound and the inbound side embodiments within the scope of the illustrative embodiments.

As an example, assume that within environment 100, application 103 is a source that exists in a local-1 network 102A and application 107 is a local target exists in a local-2 network 102B. As an example, networks 102A and 102B may be different virtual LANs within environment 100 and communication between networks 102A and 102B is enabled by a backend router (not shown). Source 103 sends packets out of local-1 network 102A via local endpoint 142. Local endpoint 142 can be implemented using a gateway as described herein. Application 105 need not necessarily be implemented within local endpoint 142 but may operate in conjunction therewith in any suitable manner as described herein.

Repository 108 stores data 109. Data 109 comprises a set of address records (or target codes in any other suitable form), and a set of swapping rules. Source 103 operates in local-1 network 102A. Local endpoint 142 with the functionality imparted by application 105 uses data 109 to route a packet from source 103 correctly in a manner described herein. Data 109 in repository 108 may also include a set of swap-back rules for use when local endpoint 142 receives a packet in which an octet has been swapped.

Within environment 101A, application 152A is a remote target in remote network 148A. Further assume that local-2 network 102B in environment 100 and remote network 148A have an overlap in their address-spaces in at least one octet. Target 152A in system 150A on remote network 148A receives data packets from source 103 over VPN 144A via remote endpoint 146A. Remote endpoint 146A can be implemented using a gateway as described herein. Application 105A need not necessarily be implemented within remote endpoint 146A but may operate in conjunction therewith in any suitable manner as described herein.

Repository 154A stores data 156A. Data 156A comprises a set of swap-back rules for use when local endpoint 146A receives a packet in which an octet has been swapped as described herein. Remote endpoint 146A with the functionality imparted by application 105A uses data 156A to route a packet to target 152A correctly in a manner described herein. Data 156A in repository 154A may also include a set of address records (or target codes in any other suitable form), and a set of swapping rules for use when application 152A has to send a packet to one of the targets in one of the networks that have an address space overlap.

Environments 101B and 101C are also configured as remote networks in the manner of environment 101A. Two or more of environments 101A-C may also have an overlap with each other in their address-spaces (with or without overlapping with local-2 network 102B). Only three example remote environments are depicted for the clarity of the figures. Any number of remote environments can be similarly implemented.

Within environment 101B, application 152B is a remote target in remote network 148B. Further assume that network 148A in environment 101A and remote network 148B in environment 101B have an overlap in their address-spaces in at least one octet. Target 152B in system 150B on remote network 148B receives data packets from source 103 over VPN 144B via remote endpoint 146B. Remote endpoint 146B can be implemented using a gateway as described herein. Application 105B need not necessarily be implemented within remote endpoint 146B but may operate in conjunction therewith in any suitable manner as described herein.

Repository 154B stores data 156B. Data 156B comprises a set of swap-back rules for use when local endpoint 146B receives a packet in which an octet has been swapped as described herein. Remote endpoint 146B with the functionality imparted by application 105B uses data 156B to route a packet to target 152B correctly in a manner described herein. Data 156B in repository 154B may also include a set of address records (or target codes in any other suitable form), and a set of swapping rules for use when application 152B has to send a packet to one of the targets in one of the networks that have an address space overlap.

Within environment 101C, application 152C is a remote target in remote network 148C. Further assume that one or more of network 148A in environment 101A and network 148B in environment 101B, and remote network 148B in environment 101B, have an overlap in their address-spaces in at least one octet. Target 152C in system 150C on remote network 148C receives data packets from source 103 over VPN 144C via remote endpoint 146C. Remote endpoint 146C can be implemented using a gateway as described herein. Application 105C need not necessarily be implemented within remote endpoint 146C but may operate in conjunction therewith in any suitable manner as described herein.

Repository 154C stores data 156C. Data 156C comprises a set of swap-back rules for use when local endpoint 146C receives a packet in which an octet has been swapped as described herein. Remote endpoint 146C with the functionality imparted by application 105C uses data 156C to route a packet to target 152C correctly in a manner described herein. Data 156C in repository 154C may also include a set of address records (or target codes in any other suitable form), and a set of swapping rules for use when application 152C has to send a packet to one of the targets in one of the networks that have an address space overlap.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCL/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCL/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and 105A-C in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
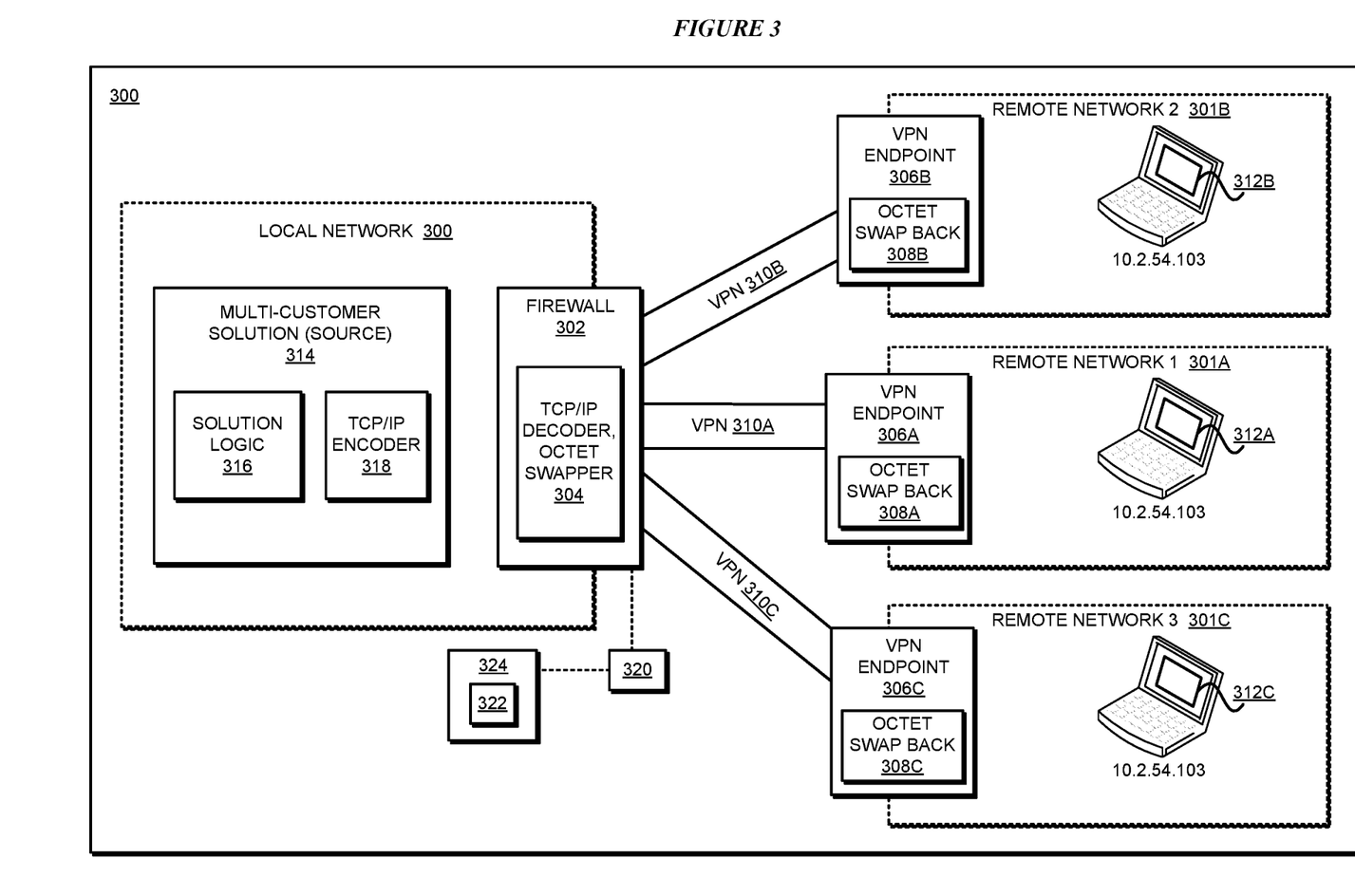
FIG. 3 depicts a block diagram of an example configuration for routing packets in multiple destination networks with overlapping address spaces in accordance with an illustrative embodiment.

With reference to FIG. 3, this figure depicts a block diagram of an example configuration for routing packets in multiple destination networks with overlapping address spaces in accordance with an illustrative embodiment. Firewall 302 in local network 300 is an example of local endpoint 142 in FIG. 1. Firewall 302 is enabled by TCP/IP decoder and octet swapper functionality 304, which is an example of application 105, as described herein.

VPN endpoint 306A in remote environment 301A is an example of remote endpoint 146A in FIG. 1. VPN endpoint 306A has been enabled by octet swap-back functionality 308A, which is an example of application 105A as described herein. VPN 310A provides a path for data packets to travel from endpoint 302 to endpoint 306A and finally to target 312A in remote environment 301A. Suppose that target 312A is reachable at address 10.2.54.103 in remote network 301A.

VPN endpoint 306B in remote environment 301B is an example of remote endpoint 146B in FIG. 1. VPN endpoint 306B has been enabled by octet swap-back functionality 308B, which is an example of application 105B as described herein. VPN 310B provides a path for data packets to travel from endpoint 302 to endpoint 306B and finally to target 312B in remote environment 301B. Suppose that target 312B is also reachable at address 10.2.54.103 in remote network 301B.

VPN endpoint 306C in remote environment 301C is an example of remote endpoint 146C in FIG. 1. VPN endpoint 306C has been enabled by octet swap-back functionality 308C, which is an example of application 105C as described herein. VPN 310C provides a path for data packets to travel from endpoint 302 to endpoint 306C and finally to target 312C in remote environment 301C. Suppose that target 312C is also reachable at address 10.2.54.103 in remote network 301C.

Multi-customer solution 314 is an example of source 103. Solution 314 comprises solution logic 316 and TCP/IP encoder 318. TCP/IP encoder 318 is an example of a modified functionality imparted by an embodiment to solution 314, as described herein.

Solution 314 with functionality 318 is referred to as improved solution 314. Firewall 302 with functionality 304 is referred to as improved firewall 302. VPN endpoints 306A-C with functionality 308A-C, respectively, are referred to as VPN endpoints 306A-C, respectively.

In an example problematic operation, which improved solution 314, improved firewall 302, and improved VPN endpoints 306A-C solve, solution logic 316 prepares a packet to send to remote target 312B at address 10.2.54.103. TCP/IP encoder 318 determines that the target code "123" is associated with the intended target.

A target code can be associated with an intended target in a variety of ways. For example, code "123" can be associated with, and correspond to either (i) remote network 301B as a whole, (ii) specifically IP address 10.2.54.103 within remote network 301B, (iii) an address-space including IP address 10.2.54.103 and a network identifier associated with network 301B, or (iv) some combination of i, ii, and iii.

Returning to the example operation, TCP/IP encoder 318 modifies a predetermined field in a predetermined header in the prepared packet such that the field contains the value "123", forming an encoded packet as described herein. TCP/IP encoder 318 sends the encoded packet with a target address 10.2.54.103 and code "123" in a field in a header to firewall 302.

TCP/IP decoder and octet swapper functionality 304 in firewall 302 determines whether the encoded packet includes a target code in the predetermined field of the predetermined header. Functionality 304 finds the code "123" in the predetermined field of the predetermined header. Using a swapping rule, e.g., from repository 108 in FIG. 1, functionality 304 determines that code "123" corresponds to the value "2" in the first octet of the target address of the encoded packet. Functionality 304 changes the first octet of the target address of the encoded packet to "2", causing the modified target address to become 2.2.54.103.

Firewall 302 directs the packet with the modified target address to VPN 310B because VPN 310B is associated with 2.x.x.x addresses at firewall 302. When the packet with the swapped octet reaches VPN endpoint 306B, functionality 308B uses a swap-back rule to change the octet back to the original value "10". The target address then becomes 10.2.54.103 and is uniquely resolved to target 312B in remote network 301B. VPN endpoint 306B then routes the packet to remote target 312B in remote network 301B.

At firewall 302, if the packet arriving from solution 314 did not include a target code in the predefined field in the predefined header, functionality 304 does not replace an octet value. The address 10.2.54.103 is then resolved locally at firewall 302. For example, firewall 302 routes the packet to backend router 320, which routes the packet to local target 322 in another local network 324.

Figure 4:
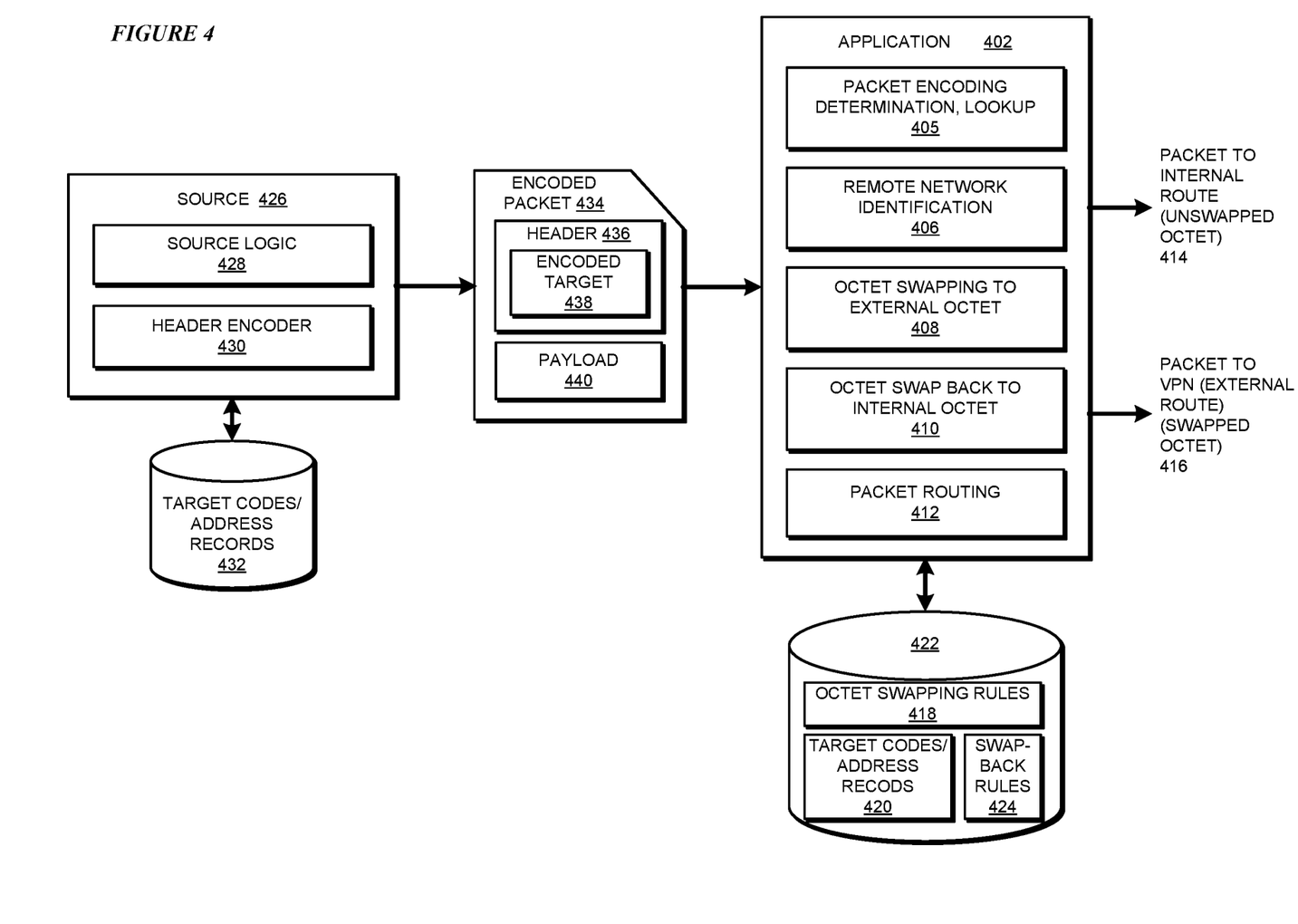
FIG. 4 depicts a block diagram of an application for routing packets in multiple destination networks with overlapping address spaces in accordance with an illustrative embodiment.

With reference to FIG. 4, this figure depicts a block diagram of an application for routing packets in multiple destination networks with overlapping address spaces in accordance with an illustrative embodiment. Application 402 can be completely or partially implemented at endpoints existing at either end of a VPN to impart a selected functionality of an embodiment to each endpoint. For example, in one installation, application 402 can be implemented as a whole to form improved firewall endpoint 302 (a VPN endpoint); and application 402 can be implemented as a whole to form improved VPN endpoints 304. Alternatively, in another installation, only component 418 can be implemented to form improved solution 314; only components 405, 406, 408, and 412 can be implemented to form improved firewall/endpoint 302; and only components 410 and 412 can be implemented to form improved endpoints 306A-C.

When application 402 is implemented on the outbound side of a VPN, i.e., in solution 314 and firewall/endpoint 302, the configuration depicted in FIG. 4 operates as follows—

Source 426—an example of solution 314 in FIG. 3, has source logic 428, which is an example of solution logic 316 in FIG. 3. Header encoder 430, which is an example of TCP/IP encoder 318 in FIG. 3, uses target codes (or address records) 432 to identify and encode a suitable target code into the packet header depending upon the remote target of the packet.

Thus-formed encoded packet 434 comprises header 436, which includes encoded target 438. Encoded packet 434 includes payload 440. Encoded packet 434 is an outbound packet with a target address that is known or suspected to belong to overlapping address-spaces implemented by more than one remote networks.

Encoded packet 434 forms an input to application 402. Component 405 determines whether a valid target code 438 for a remote network is present in packet 434. When packet 434 does not have a valid target code 438 in the designated field, or has a code that indicates that the target is not remote, component 412 routes the packet to the local-side of application 402, e.g., in the form of packet 414.

When packet 434 does have a valid target code 438 in the designated field, or has a code that indicates that the target is remote, component 406 performs remote network identification using repository 422 operating on the outbound side of the VPN. Particularly, component 406 uses an address records 420 in repository 422—which may be the same or different copy of target codes/address records 432 depending upon the implementation—to decide which of the several remote networks is the correct destination of the packet. Once component 406 determines that packet 434 is directed to a target in a specific remote network, component 408 extracts or selects a swapping rule 418 for the remote network from repository 422. Component 408 applies selected swapping rule 418 to packet 434 and modifies an octet in the target address of packet 434.

Various operations and data are described separately only for the clarity of the description and not as a limitation of the illustrative embodiment. For example, the operations of component 406 and 408 can be combined, and address records 420 and swapping rules 418 can be combined in repository 422 within the scope of the illustrative embodiments.

Component 412 routes the modified version of packet 434—where an octet of the target address has been swapped—via a VPN that corresponds to the correct remote network. Packet 416 is the modified version of packet 434 that is routed to a VPN in this manner.

When application 402 is implemented on the inbound side of a VPN, e.g., in conjunction with VPN endpoint 306B in FIG. 3, the input to application 402 comprises an inbound packet having a target IP address, e.g., packet 416. Component 410 determines whether a swap-back rule 424 in repository 422 (repository 422 now operating on the inbound side of the VPN) applies to the target address of packet 416. For example, a swap-back rule applies if the target address has a swapped octet.

If a swap-back rule 424 applies, component 410 causes a swap-back, i.e., reversion or overwriting of the swapped octet to the value of the octet that would be needed for routing the packet in the network on the inbound side of the VPN. Component 412 then routes the packet with the swapped-back target address to the destination.

Figure 5:
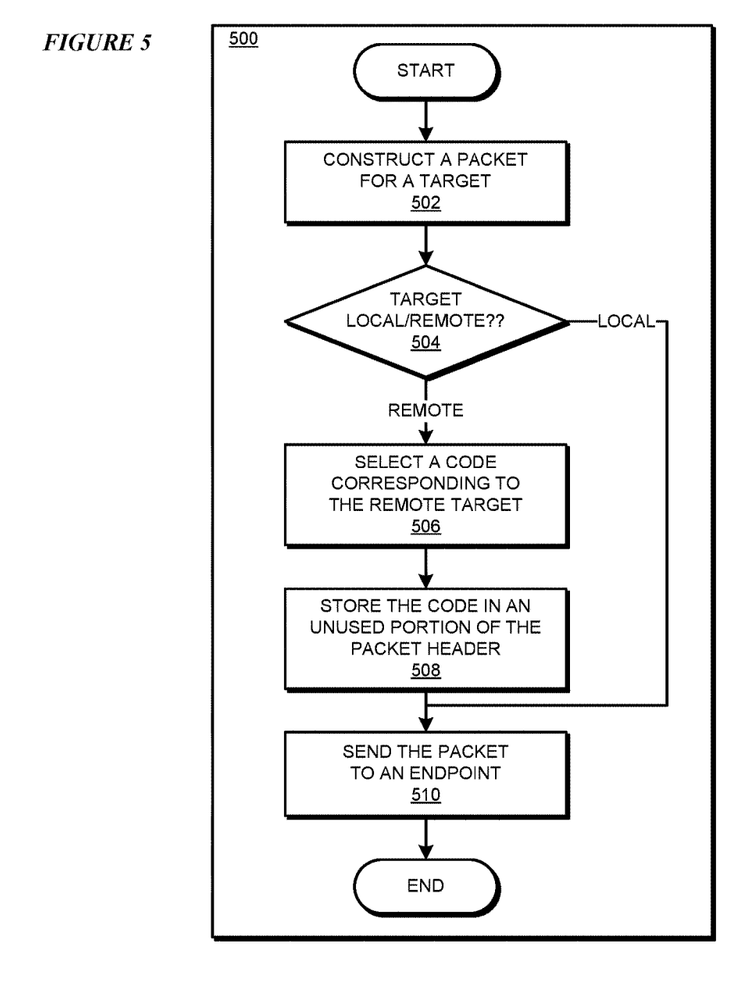
FIG. 5 depicts a flowchart of an example process in routing packets in multiple destination networks with overlapping address spaces in accordance with an illustrative embodiment.

With reference to FIG. 5, this figure depicts a flowchart of an example process in routing packets in multiple destination networks with overlapping address spaces in accordance with an illustrative embodiment. Process 500 can be implemented in header encoder functionality 430 in FIG. 4.

The functionality detects that an outbound packet has been constructed for a target (block 502). The functionality determines whether the target is local or remote relative to the endpoint to which the source will send the packet (block 504).

If the target is local ("local" path of block 504), the functionality proceeds to block 510. If the target is remote ("remote" path of block 504) the functionality selects a code corresponding to the remote target (block 506), the functionality stores the code in a predetermined unused portion of a predetermined header in the packet (block 508). The functionality sends the packet to an endpoint (block 512). The functionality ends process 500 thereafter.

Figure 6:
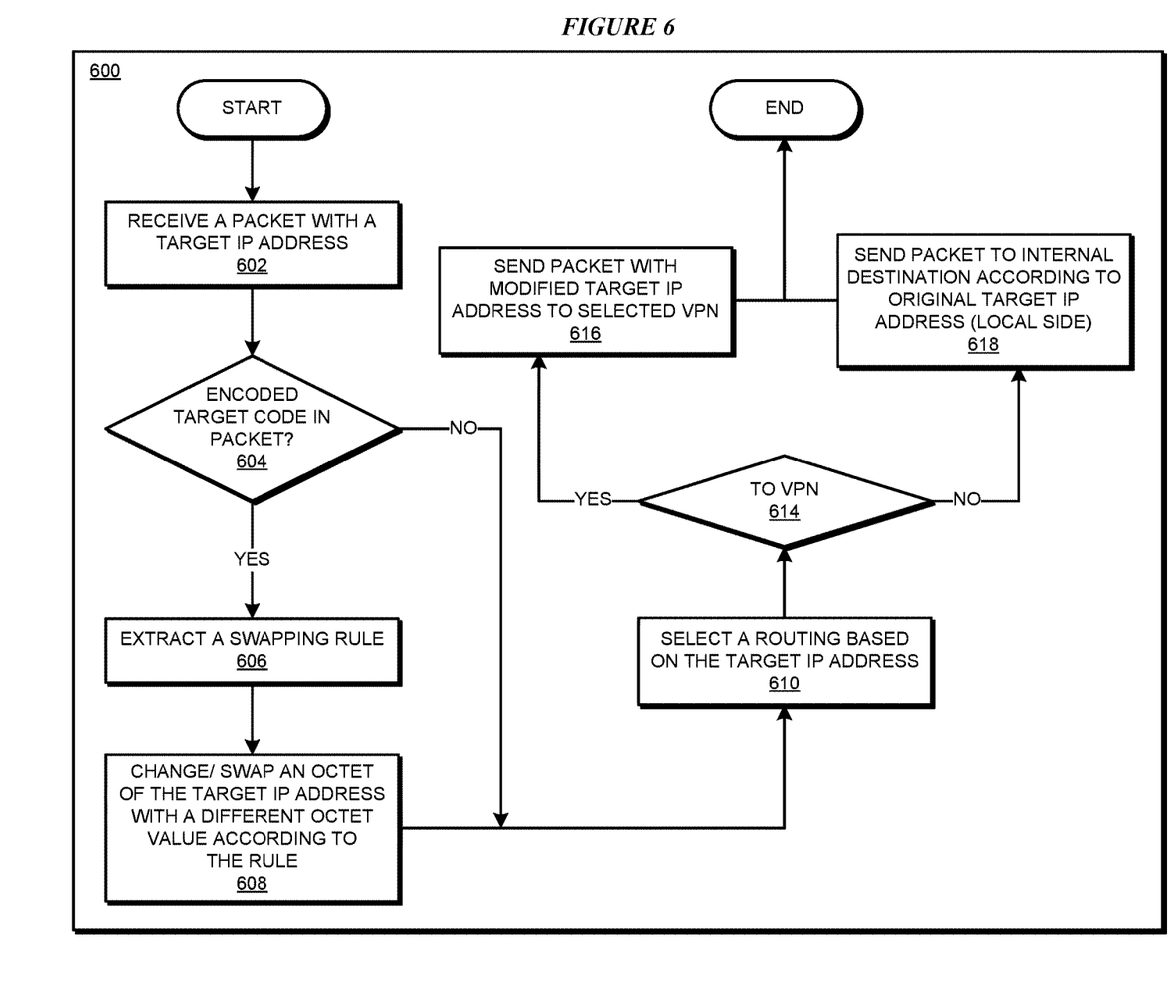
FIG. 6 depicts a flowchart of another example process for routing packets in multiple destination networks with overlapping address spaces in accordance with an illustrative embodiment.

With reference to FIG. 6, this figure depicts a flowchart of another example process for routing packets in multiple destination networks with overlapping address spaces in accordance with an illustrative embodiment. Process 600 can be implemented as application 402 in FIG. 4, such as when application 402 is used on the outbound side of the VPN.

The application receives a packet that has a target address (block 602). The application determines whether the packet has an encoded target code for a remote target in a designated location therein (block 604).

If a target code indicative of a remote target is not present in the packet ("No" path of block 604), the application proceeds to block 610. If a target code indicative of a remote target is present in the packet ("Yes" path of block 604), the application extracts a swapping rule corresponding to the target code (block 606). The application changes or swaps an octet value in the target address with a different octet value according to the extracted swapping rule (block 608). The application then routes the packet with the (modified) target address (block 610).

In order to route the packet, the application determines whether the target address is one that is to be routed using a VPN to a remote network (block 614). If the packet has to be routed to a VPN, e.g., when the target address has a swapped octet ("Yes" path of block 614), the application selects a suitable VPN according to the modified target address and sends the packet to the VPN (block 616). If the packet does not have to be routed to a VPN, e.g., when the target address is unchanged ("No" path of block 614), the application sends the packet to the local-side network, e.g., via a backend router (block 618). The application ends process 600 thereafter.

Figure 7:
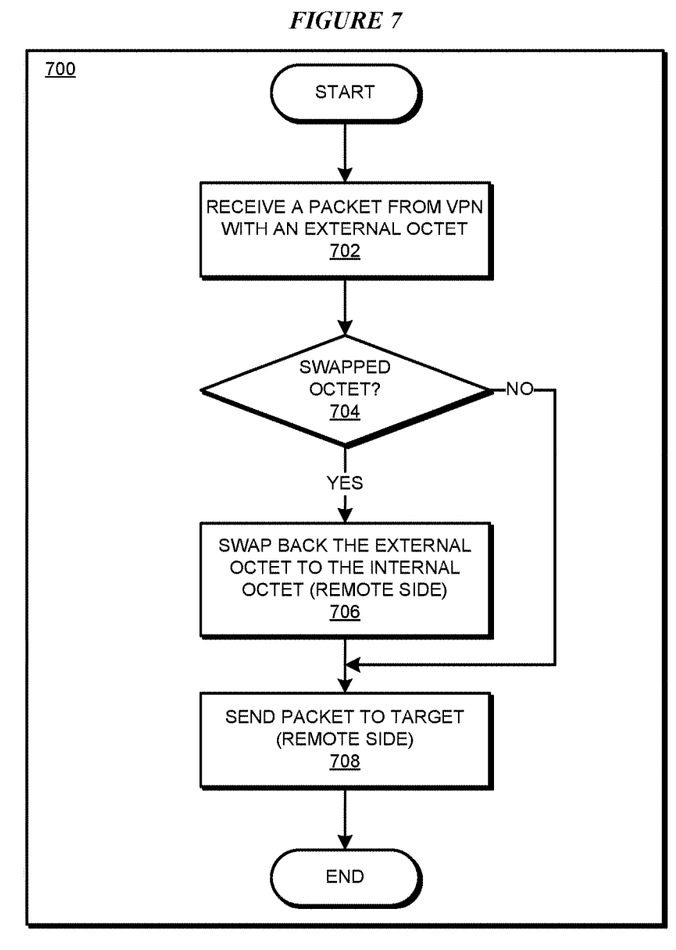
FIG. 7 depicts a flowchart of another process in routing packets in multiple destination networks with overlapping address spaces in accordance with an illustrative embodiment.

With reference to FIG. 7, this figure depicts a flowchart of another process in routing packets in multiple destination networks with overlapping address spaces in accordance with an illustrative embodiment. Process 700 can be implemented in application 402 in FIG. 4, such as when application 402 is used on the inbound side of the VPN.

The application receives an inbound packet (block 702). The application determines whether the packet has a swapped octet in the target address, e.g., by determining whether the target address satisfies any of the swap-back rules (block 704). If a swapped octet exists ("Yes" path of block 704), the application swaps back the octet to a value, e.g., a value according to the matching swap-back rule, which allows the packet to be routed to the intended target (block 706). The application sends the packet with the swapped back octet to the destination (block 708). The application ends process 700 thereafter.

If a swapped octet does not exist in the packet ("No" path of block 704), the application sends the unmodified inbound packet to the destination (block 708). The application ends process 700 thereafter.

Thus, a computer implemented method, system or apparatus, and computer program product are provided in the illustrative embodiments for routing packets in multiple destination networks with overlapping address spaces and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    analyzing, at a first data network, a field in a header of a packet to determine whether the packet is directed to a first remote target in a first remote data network or to a local target in a local data network, wherein a target address of the packet is present in the first remote data network and the local data network;
    changing, responsive to a field indicating that the packet is directed to the first remote target in the first remote data network, an octet in an internet protocol version 4 (IPv4) representation of the target address of the packet from a first value to a second value, the changing forming a modified packet, wherein the second value in the modified packet causes the packet to be directed to a tunnel configured to receive packets having the second value in the octet;
    determining, using a value in the field in the header of a second packet, that the second packet is directed to a local target in the local data network, wherein the local data network and the first remote network are on opposite sides of the tunnel; and
    causing, by omitting the changing for the second packet, the second packet to be directed to the local data network.

2. The method of claim 1, further comprising:
    causing, at a source of the packet, a first code corresponding to the first remote data network to be stored in the field in the header of the packet, wherein the analyzing uses the first code to determine that the packet is directed to the first remote target even though the target address of the packet is present in both the first remote data network and the local data network.

3. The method of claim 2, wherein the source and the local target are in different data networks on same side of the tunnel.

4. The method of claim 1, further comprising:
    causing a third packet to be received at an inbound end of the tunnel at the first remote data network;

causing a determination at the inbound end whether the third packet has the second value in the octet in the target address;

modifying, responsive to the target address having the second value in the octet, the second value to a third value, wherein the third value is suitable for routing the third packet to the first remote target in the first remote data network, the modifying forming a modified third packet; and routing the modified third packet to the first remote target in the first remote data network.

5. The method of claim 4, wherein a target address in the third packet is the target address in the modified packet.

6. The method of claim 4, wherein a target address in the modified third packet is the target address in the packet.

7. The method of claim 1, further comprising:
selecting the tunnel from a plurality of tunnels, wherein the tunnel corresponds to the second value of the octet.

8. The method of claim 1, wherein the first remote data network is configured with a first set of internet protocol version 4 (IPv4) addresses and a second remote data network is configured with a second set of IPv4 addresses, and wherein the first set of IPv4 addresses and the second set of IPv4 addresses have at least one subset of addresses that are same in the first and the second sets, and wherein the target address is a member of the at least one subset of addresses.

9. The method of claim 1, wherein the octet is a first octet in the IPv4 target address.

10. A computer usable program product comprising one or more computer-readable storage devices, and program instructions stored on at least one of the one or more storage devices, the stored program instructions comprising:
program instructions to analyze, at a first data network, a field in a header of a packet to determine whether the packet is directed to a first remote target in a first remote data network or to a local target in a local data network, wherein a target address of the packet is present in the first remote data network and the local data network;
program instructions to change, responsive to field indicating that the packet is directed to the first remote target in the first remote data network, an octet in an internet protocol version 4 (IPv4) representation of the target address of the packet from a first value to a second value, the changing forming a modified packet, wherein the second value in the modified packet causes the packet to be directed to a tunnel configured to receive packets having the second value in the octet;
program instructions to determine, using a value in the field in the header of a second packet, that the second packet is directed to a local target in the local data network, wherein the local data network and the first remote network are on opposite sides of the tunnel; and
program instructions to cause, by omitting the changing for the second packet, the second packet to be directed to the local data network.

11. The computer usable program product of claim 10, further comprising:
program instructions to cause, at a source of the packet, a first code corresponding to the first remote data network to be stored in the field in the header of the packet, wherein the analyzing uses the first code to determine that the packet is directed to the first remote target even though the target address of the packet is present in both the first remote data network and the local data network.

12. The computer usable program product of claim 11, wherein the source and the local target are in different data networks on same side of the tunnel.

13. The computer usable program product of claim 10, further comprising:
program instructions to cause a third packet to be received at an inbound end of the tunnel at the first remote data network;
program instructions to cause a determination at the inbound end whether the third packet has the second value in the octet in the target address;
program instructions to modify, responsive to the target address having the second value in the octet, the second value to a third value, wherein the third value is suitable for routing the third packet to the first remote target in the first remote data network, the modifying forming a modified third packet; and
program instructions to route the modified third packet to the first remote target in the first remote data network.

14. The computer usable program product of claim 13, wherein a target address in the third packet is the target address in the modified packet.

15. The computer usable program product of claim 13, wherein a target address in the modified third packet is the target address in the packet.

16. The computer usable program product of claim 10, further comprising:
program instructions to select the tunnel from a plurality of tunnels, wherein the tunnel corresponds to the second value of the octet.

17. The computer usable program product of claim 10, wherein the first remote data network is configured with a first set of internet protocol version 4 (IPv4) addresses and a second remote data network is configured with a second set of IPv4 addresses, and wherein the first set of IPv4 addresses and the second set of IPv4 addresses have at least one subset of addresses that are same in the first and the second sets, and wherein the target address is a member of the at least one subset of addresses.

18. The computer usable program product of claim 10, wherein the program instructions are stored in a computer readable storage device in a data processing system, and wherein the program instructions are transferred over a network from a remote data processing system.

19. The computer usable program product of claim 10, wherein the program instructions are stored in a computer readable storage device in a server data processing system, and wherein the program instructions are downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to analyze, at a first data network, a field in a header of a packet to determine whether the packet is directed to a first remote target in a first remote data network or to a local target in a local data network, wherein a target address of the packet is present in the first remote data network and the local data network;
program instructions to change, responsive to field indicating that the packet is directed to the first remote target in the first remote data network, an octet in an internet protocol version 4 (IPv4) representation of the target address of the packet from a first value to a second value, the changing forming a modified packet, wherein the second value in the modified packet causes the packet to be directed to a tunnel configured to receive packets having the second value in the octet;

program instructions to determine, using a value in the field in the header of a second packet, that the second packet is directed to a local target in the local data network, wherein the local data network and the first remote network are on opposite sides of the tunnel; and program instructions to cause, by omitting the changing for the second packet, the second packet to be directed to the local data network.

* * * * *